(12) United States Patent
Rodriguez et al.

(10) Patent No.: US 9,489,870 B2
(45) Date of Patent: Nov. 8, 2016

(54) MEDICAL SIMULATORS WITH ENERGY HARVESTING POWER SUPPLIES

(71) Applicant: Gaumard Scientific Company, Inc., Miami, FL (US)

(72) Inventors: Alberto Rodriguez, Miami, FL (US); Miguel Enrique Carvajal, Miami Springs, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 418 days.

(21) Appl. No.: 14/164,370

(22) Filed: Jan. 27, 2014

(65) Prior Publication Data

US 2014/0212862 A1 Jul. 31, 2014

Related U.S. Application Data

(60) Provisional application No. 61/757,137, filed on Jan. 26, 2013.

(51) Int. Cl.
*G09B 23/30* (2006.01)
*G09B 23/28* (2006.01)

(52) U.S. Cl.
CPC .................................. *G09B 23/288* (2013.01)

(58) Field of Classification Search
CPC .................................................... G09B 23/288
USPC ........................................................ 434/267
See application file for complete search history.

(56) References Cited

U.S. PATENT DOCUMENTS

| | | | |
|---|---|---|---|
| 4,160,338 A * | 7/1979 | Lyons | ..................... A63H 3/28 |
| | | | 446/184 |
| 5,472,345 A | 12/1995 | Eggert | |
| 5,853,292 A | 12/1998 | Eggert et al. | |
| 6,193,519 B1 | 2/2001 | Eggert et al. | |
| 6,443,735 B1 | 9/2002 | Eggert et al. | |
| 6,503,087 B1 | 1/2003 | Eggert et al. | |
| 6,527,558 B1 | 3/2003 | Eggert et al. | |
| 6,758,676 B2 | 7/2004 | Eggert et al. | |
| 7,114,954 B2 | 10/2006 | Eggert et al. | |
| 7,192,284 B2 | 3/2007 | Eggert et al. | |
| 7,811,090 B2 | 10/2010 | Eggert et al. | |
| 7,847,421 B2 * | 12/2010 | Gardner | ................... F03G 7/08 |
| | | | 290/1 E |
| 7,866,983 B2 | 1/2011 | Hemphill et al. | |
| 7,976,312 B2 | 7/2011 | Eggert et al. | |
| 7,976,313 B2 | 7/2011 | Eggert et al. | |
| 8,016,598 B2 | 9/2011 | Eggert et al. | |
| 8,152,532 B2 | 4/2012 | Eggert et al. | |
| 8,419,438 B2 | 4/2013 | Eggert et al. | |
| 8,500,452 B2 | 8/2013 | Trotta et al. | |
| 8,517,740 B2 | 8/2013 | Trotta et al. | |
| 8,608,483 B2 | 12/2013 | Trotta et al. | |
| 8,678,831 B2 | 3/2014 | Trotta et al. | |

(Continued)

*Primary Examiner* — Robert J Utama
*Assistant Examiner* — Elroy S Crocker
(74) *Attorney, Agent, or Firm* — Haynes and Boone, LLP

(57) ABSTRACT

Devices, systems, and methods appropriate for use in medical training are provided. In some implementations, the devices, systems, and methods are not dependent on external power supplies or internal batteries. A patient simulator is provided that includes a simulated patient body portion; and an electric-harvesting system positioned within the simulated patient body portion. The electric-harvesting system converts mechanical energy applied to the simulated patient body portion into electric energy for use by one or more components of the simulated body portion.

19 Claims, 6 Drawing Sheets

(56) References Cited

U.S. PATENT DOCUMENTS

| | | |
|---|---|---|
| 8,696,362 B2 | 4/2014 | Eggert et al. |
| 8,740,624 B2 | 6/2014 | Eggert et al. |
| 2006/0290241 A1* | 12/2006 | Kornbluh .............. A63H 13/00 446/268 |
| 2008/0138778 A1* | 6/2008 | Eggert ................ G06F 19/3437 434/262 |
| 2008/0312565 A1* | 12/2008 | Celik-Butler ........ A61H 31/005 601/43 |
| 2009/0148822 A1 | 6/2009 | Eggert et al. |
| 2011/0202101 A1* | 8/2011 | Tan ..................... G09B 23/288 607/7 |

\* cited by examiner

Electrical Diagram for Energy Harvesting
from Chest Compression on Medical Simulators

MEDICAL SIMULATORS WITH ENERGY HARVESTING POWER SUPPLIES

CROSS-REFERENCE TO RELATED APPLICATIONS

The present application claims priority to and the benefit of U.S. Provisional Patent Application No. 61/757,137, filed Jan. 26, 2013, which is hereby incorporated by reference in its entirety.

BACKGROUND

As medical science has progressed, it has become increasingly important to provide non-human interactive formats for teaching patient care. Non-human interactive devices and systems can be used to teach the skills needed to successfully identify and treat various patient conditions without putting actual patients at risk. Such training devices and systems can be used by medical personnel and medical students to learn the techniques required for proper patient care. In that regard, the training of medical personnel and patients is greatly enhanced through the use of realistic hands-on training with devices and systems, such as those of the present disclosure, that mimic characteristics of natural human and, in particular, allow training of procedures commonly performed in cardiopulmonary resuscitation (CPR). To date, to incorporate advanced functionality devices and systems required power supplies that were dependent upon electrical power supplies (such as A/C wall sockets, external batteries, internal batteries, and/or combinations thereof). However, in many situations such electrical sources are not available, the batteries must be recharged/replaced, and/or other factors exist that limit the usefulness of such devices and systems.

In view of the foregoing, there remains a need for devices, systems, and methods for use in medical training that are not dependent on external power supplies or internal batteries.

SUMMARY

Devices, systems, and methods appropriate for use in medical training are provided. In some implementations, the devices, systems, and methods are not dependent on external power supplies or internal batteries.

For example, a patient simulator is provided that includes a simulated patient body portion; and an electric-harvesting system positioned within the simulated patient body portion. The electric-harvesting system converts mechanical energy applied to the simulated patient body portion into electric energy for use by one or more components of the simulated body portion. The simulated patient body portion can include a torso and the mechanical energy applied to the simulated patient body portion includes chest compressions. In some instances, the electric-harvesting system includes a drive shaft and an electrical generator. The electric-harvesting system can also include a recoil spring coupled to the drive shaft such that the recoil spring urges the drive shaft towards an original position from a displaced position. In that regard, in some implementations the electric-harvesting system harvests electrical energy during movement of the drive shaft both from the original position to the displaced position and from the displaced position to the original position. The electric-harvesting system can include one or more ultra-capacitors for storing the electric energy. The patient simulator can also include an air-harvesting system positioned within the simulated patient body portion that utilizes the mechanical energy applied to the simulated patient body portion to fill one or more reservoirs positioned within the simulated patient body with air. In some instances, the air-harvesting system includes at least one pump that is actuated by the mechanical energy applied to the simulated patient body portion.

As another example, a method of medical simulation is provided that includes applying mechanical energy to a patient simulator, wherein the applied mechanical energy is converted into electrical energy by an electric-harvesting system positioned within the patient simulator for use by one or more components of the patient simulator; and providing treatment to the patient simulator based on symptoms simulated by the one or more components of the patient simulator. The one or more components of the patient simulator can include a simulated respiratory system and/or a simulated circulatory system. In some instances, the mechanical energy is applied to the patient simulator via chest compressions. An air-harvesting system positioned within the patient simulator utilizes the mechanical energy applied to the patient simulator to fill one or more reservoirs positioned within the simulated patient body with air in some instances.

In yet another example, a patient simulator is provided that includes one or more simulated body portions; an electric-harvesting system positioned within the one or more simulated patient body portions, wherein the electric-harvesting system converts mechanical energy applied to the one or more simulated patient body portions into electric energy for use by one or more components of the patient simulator; and an air-harvesting system positioned within the one or more simulated patient body portions, wherein the air-harvesting system utilizes the mechanical energy applied to the one or more simulated patient body portions to fill one or more reservoirs with air. In some implementations, the one or more simulated body portions include a head and a torso. The mechanical energy applied to the one or more simulated patient body portions can include chest compressions. In some instances, the electric-harvesting system harvests electrical energy during both downward and upward movements of the chest associated with the chest compressions. Similarly, in some instances the air-harvesting system fills the one or more reservoirs with air during both the downward and upward movements of the chest associated with the chest compressions.

BRIEF DESCRIPTION OF THE DRAWINGS

The present disclosure can be better understood from the following detailed description when read with the accompanying figures.

DETAILED DESCRIPTION

Figure 1:
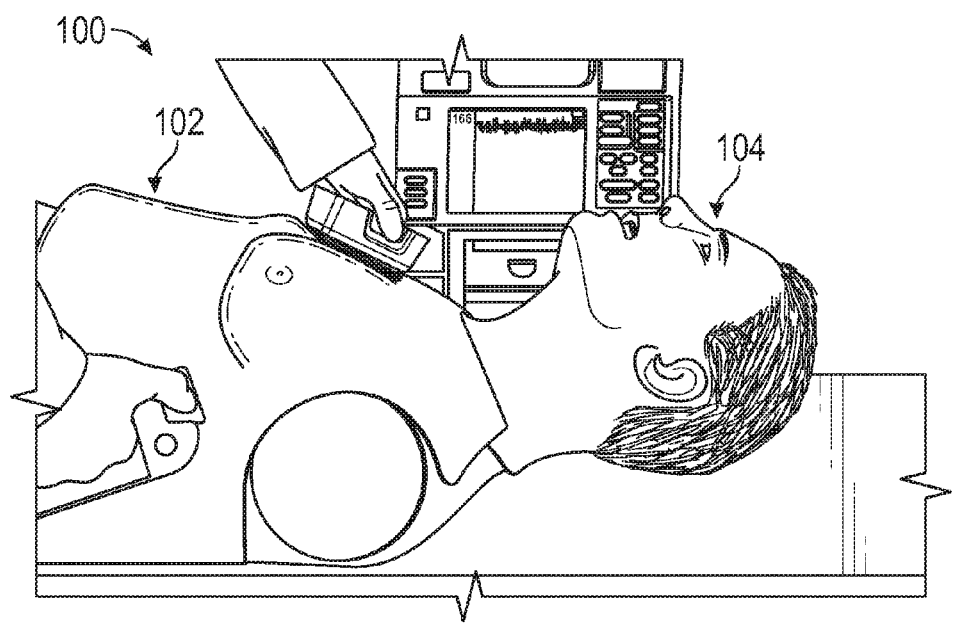
FIG. 1 is a perspective, side view of a patient simulator according to an embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 2:
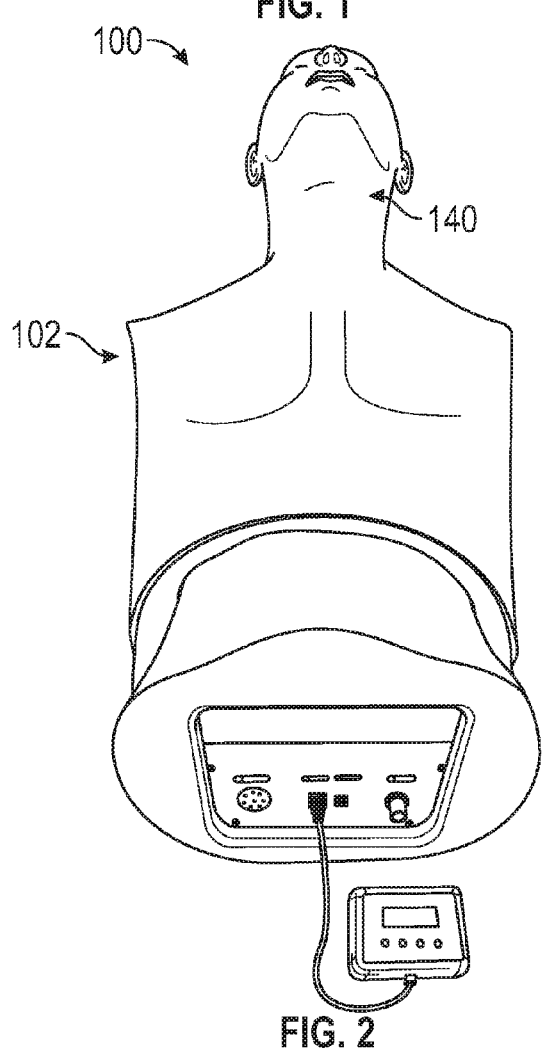
FIG. 2 is a perspective, end view of the patient simulator of FIG. 1.

Referring initially to FIGS. 1 and 2, shown therein is a patient simulator 100. In the illustrated embodiment, the patient simulator 100 is a partial body patient simulator. To that end, the patient simulator 100 includes a torso 102 and a head 104. In other embodiments, the patient simulator 100 is a full body patient simulator that includes a torso, arms, legs, and a head. The various anatomical portions of the patient simulator 100 are sized, shaped, and formed of a suitable material to mimic natural human anatomy. The patient simulator 100 can be either a male simulator or a female simulator and will include appropriate anatomical features based on the simulated gender. Further, in some instances, the patient simulator 100 includes a simulated circulatory system, a simulated respiratory system, and/or other simulated aspects. In that regard, the patient simulator 100 is in communication with a control system configured to control the circulatory system, respiratory system, and/or other aspects of the patient simulator. For example, in some instances, the control system is configured to adjust parameters associated with the circulatory system, respiratory system, and/or other aspects of the patient simulator 100 in accordance with a settings selected by a user/instructor and/or a user's application of treatment to the patient simulator 100.

The patient simulator 100 is configured to convert and store the energy applied by a trainee while performing chest compressions to facilitate operation of the internal and external components of the patient simulator system. In that regard, electrical energy generated and captured while compressing the chest of the patient simulator (this may be referred to as energy recovery or energy harvesting) is sufficient to provide electrical power to electronic modules inside/outside the simulator that are used to provide circulatory, respiratory, and/or other simulation features as well as evaluate a user's performance in treating the patient simulator. In some implementations, two-way power generation is implemented such that energy is generated and stored during both compression of the chest (downward movement) and rebound of the chest (upward movement). Compressing the chest of the patient simulator is also utilized to inflate one or more air reservoirs or chambers that are utilized in the circulatory, respiratory, and/or other simulation features of the patient simulator. The capturing of air in this manner may be referred to as air recovery or air harvesting. In some instances, the chest compressions serve as a pumping action to fill the one or more air reservoirs or chambers. In some implementations, a two-way pumping action is implemented such that the reservoirs or chambers are filled during both compression of the chest (downward movement) and rebound of the chest (upward movement). In this manner, a combination of energy harvesting and air harvesting from chest compressions on the patient simulator provide all of the necessary energy and air supply to operate the advanced features of the patient simulator 100.

To begin use of the patient simulator a minimum number of chest compressions must be performed to provide sufficient power for the system to initiate operation of the medical simulation features. Accordingly, in some instances the patient simulator 100 provides a human intelligible indicator (e.g., visual, audible, tactile, and/or combinations thereof) regarding the power level of the patient simulator such that a user/instructor is able to tell when the patient simulator is ready for use. In some instances, only a small number of chest compressions (e.g., between 1 and 30 compressions) are needed to activate the system. Further, since additional chest compressions provide additional power and/or air for use by the patient simulator 100, the simple use of the patient simulator alone continually provides energy and air to the system such that there is no need to stop or otherwise interfere with the use of the patient simulator to recharge/refill the system.

Figure 3:
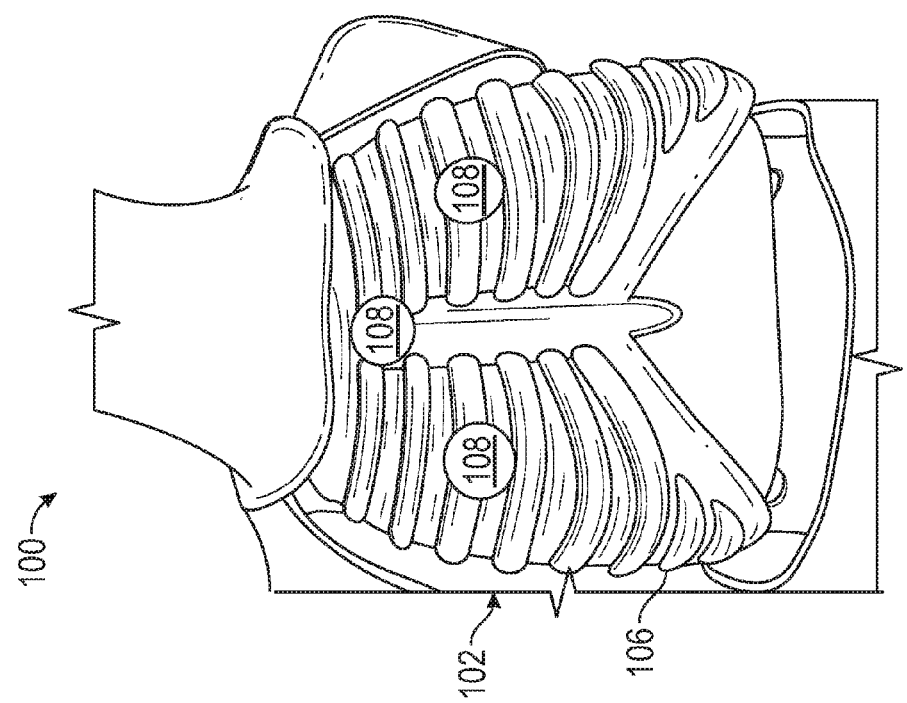
FIG. 3 is a top view of a portion of the patient simulator of FIGS. 1 and 2 with a section of an outer skin removed to reveal some inner components of the patient simulator according to an embodiment of the present disclosure.
Figure 5:
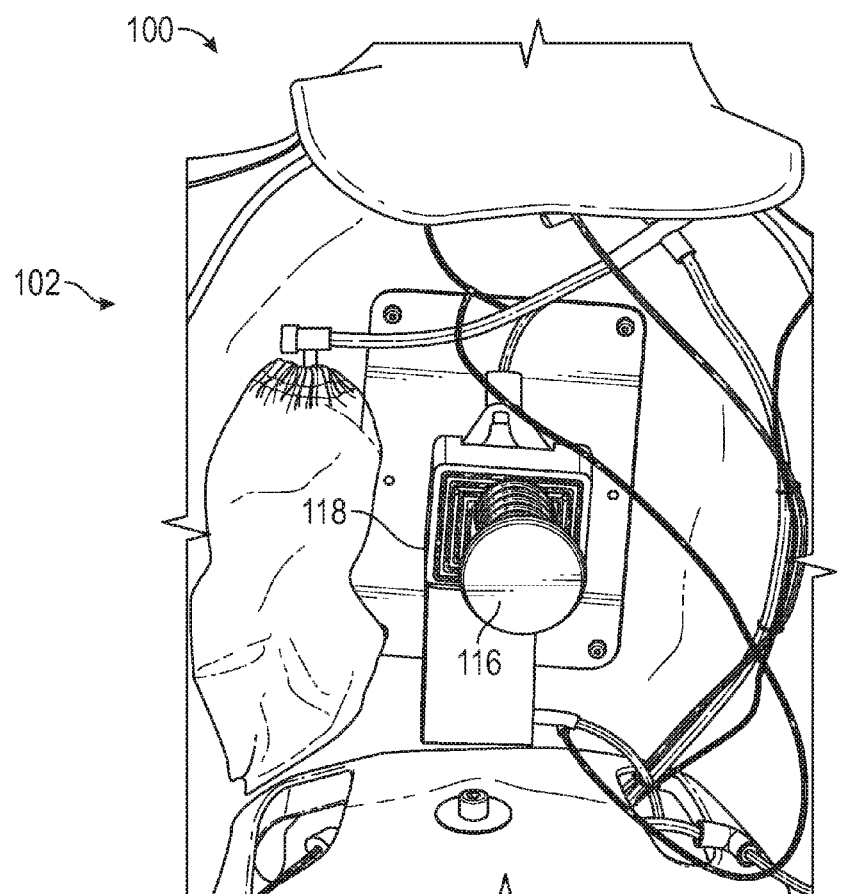
FIG. 5 is a top view of a portion of the patient simulator, similar to that of FIGS. 3 and 4, but with additional portions of the patient simulator removed to reveal other inner components of the patient simulator according to an embodiment of the present disclosure.

Referring now to FIGS. 3-6, some internal aspects of the patient simulator 100 will be described. As shown in FIG. 3, a section of an outer skin of the patient simulator 100 has been removed to reveal some inner components of the patient simulator according to an embodiment of the present disclosure. In particular, a simulated rib cage and sternum structure 106 formed of a suitable material (e.g., vinyls, polymers, silicons, and/or combinations thereof) is shown. Further, a plurality of expandable chambers 108 are positioned on the simulated rib cage and sternum structure 106. In some instances, the expandable chambers 108 are in communication with an air supply (discussed in greater detail below with respect to FIGS. 10 and 11, for example) and corresponding valves such that selective inflation and deflation of the chambers 108 can be used to cause a chest rise (and drop) of the patient simulator 100 indicative of the patient simulator breathing. In particular, as the chambers 108 are inflated the outer skin layer of the patient simulator will be forced upwards simulating a chest rise and when the chambers 108 are deflated the outer skin layer will lower back to the original position.

Figure 4:
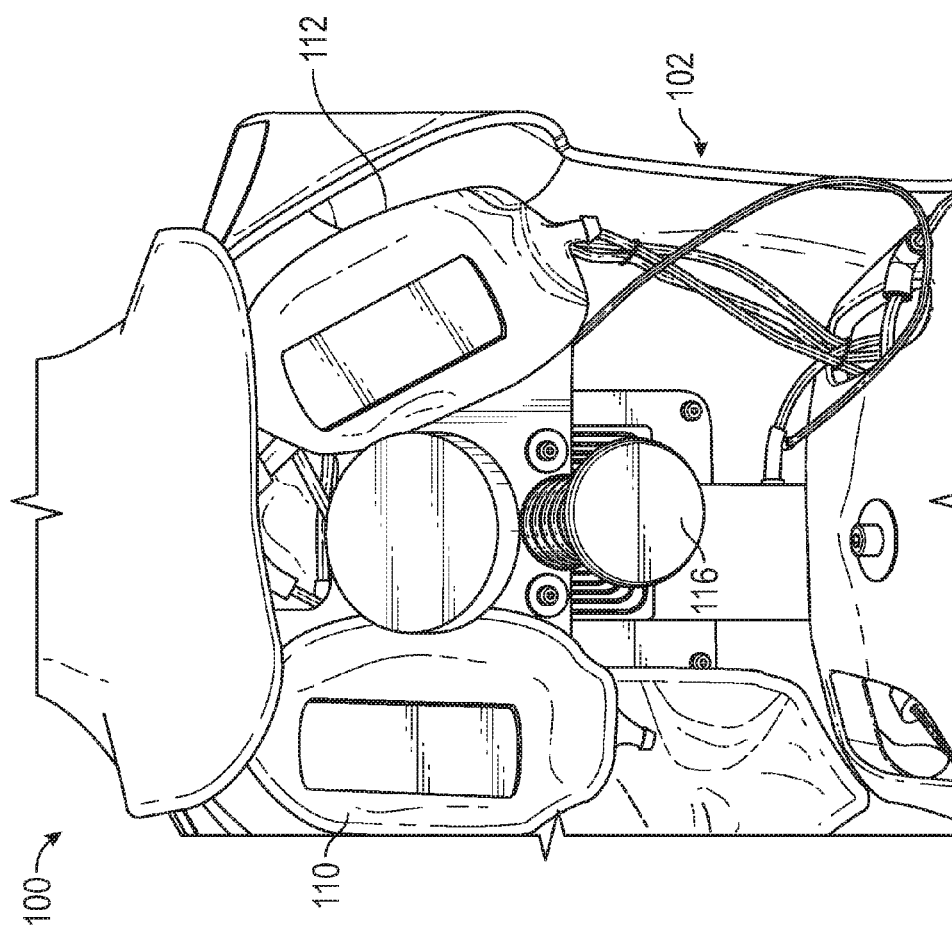
FIG. 4 is a top view of a portion of the patient simulator, similar to that of FIG. 3, but with additional portions of the patient simulator removed to reveal other inner components of the patient simulator according to an embodiment of the present disclosure.

FIG. 4 shows additional internal components of the patient simulator with the simulated rub cage and sternum structure 106 removed. In particular, bladders or reservoirs 110 and 112 are shown. The reservoirs 110 and 112 are configured to contain air that is utilized as an air supply to the chest rise function described above and/or a pulse and/or blood pressure simulation function. With respect to the pulse and/or blood pressure simulation function, the air from the reservoirs 110 and 112 is selective passed into one or more tubes that simulate arteries and/or veins of the patient simulator. In some particular embodiments, tubes are positioned in the neck of the patient simulator 100 in order to simulate the carotid artery and/or vein such that a carotid pulse can be detected by a user when the patient simulator heart has resumed beating.

Figure 6:
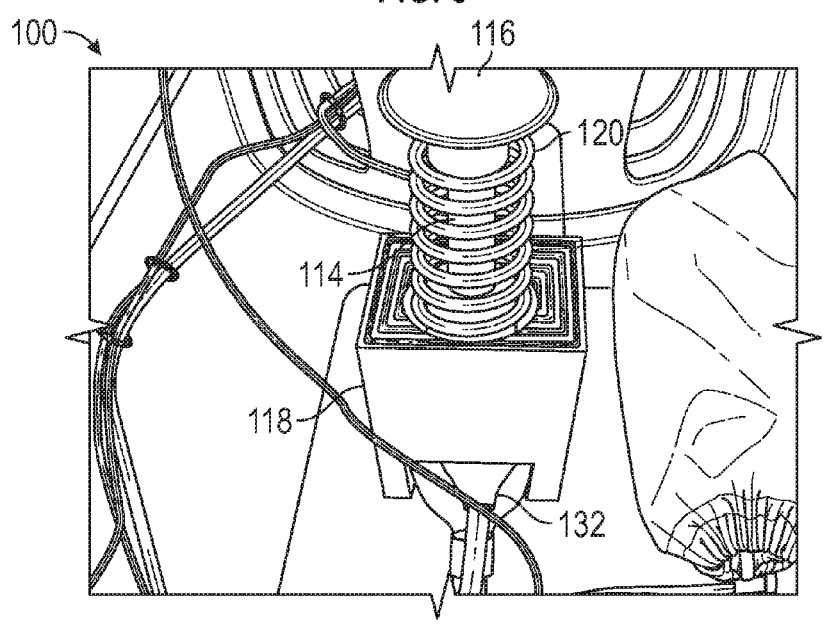
FIG. 6 is a perspective view of a portion of an energy and air harvesting systems of the patient simulator of FIGS. 1-5 according to an embodiment of the present disclosure.
Figure 7:
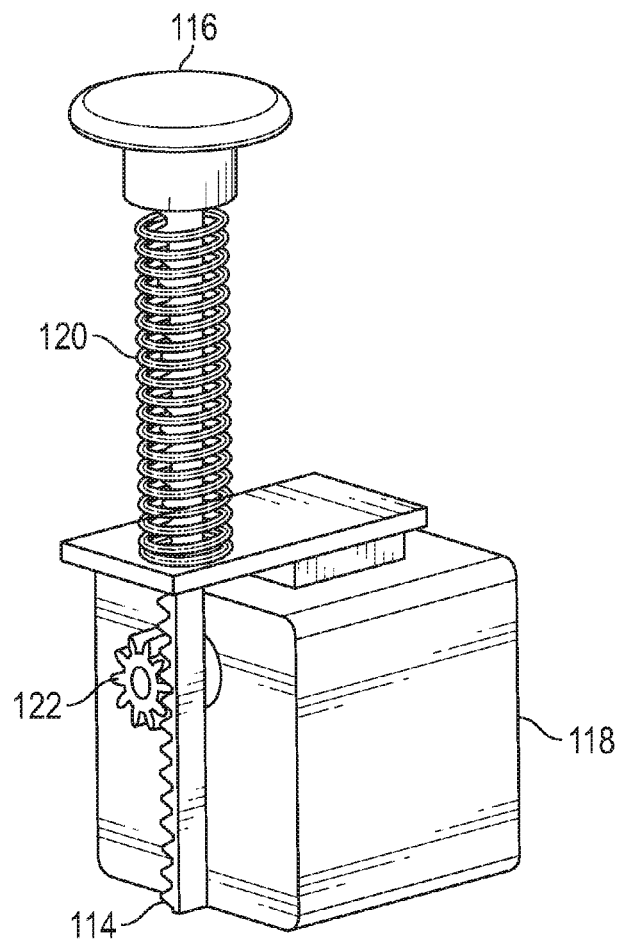
FIG. 7 is a schematic perspective view of a portion energy harvesting system for use in the patient simulators of the present disclosure according to an embodiment of the present disclosure.

As shown in FIGS. 4-7, the patient simulator 100 also includes a drive shaft 114 having an upper end 116 associated with the electric harvesting system. In particular, the drive shaft 114 is positioned within the patient simulator 100 such that when a user performs chest compressions on the patient simulator the upper end 116 of the drive shaft 114 will be forced downward. The downward motion imparted on the upper end 116 of the drive shaft 114 causes movement of the remainder of the drive shaft with respect to an electrical generator 118. The downward motion of the drive shaft 114 also compresses a recoil spring 120 surrounding a section of the drive shaft. The recoil spring 120 is configured to cause the chest of the patient simulator 100 to rise following the chest compression by urging the upper end 116 of the drive shaft 114 back to its starting position. The spring 120 provides a realistic chest recoil after each compression. In that regard, during both the downward movement of the of drive shaft 114 (associated with the chest compression) and the upward movement of the drive shaft 114 (associated with the spring recoil), the drive shaft engages a rotor or gear 122 of the electrical generator 118 (as shown in FIG. 7). This physical link between the drive shaft 114 and the electrical generator 118 allows the mechanical energy produced by a user while doing chest compressions to be converted into electrical energy.

Figure 8:
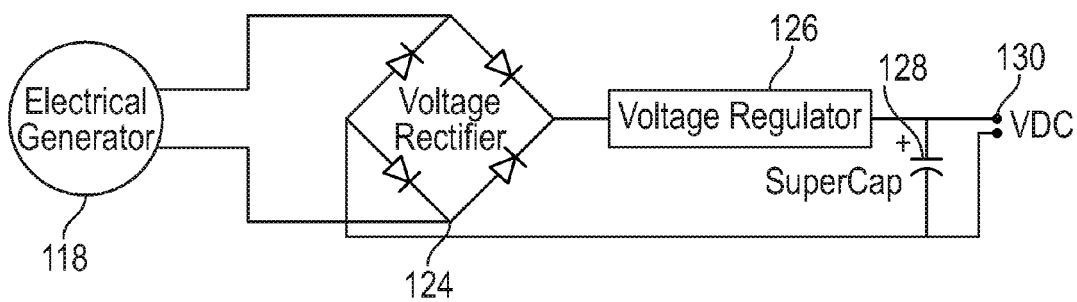
FIG. 8 is a schematic diagram of an energy harvesting system for use in the patient simulators of the present disclosure according to an embodiment of the present disclosure.

For maximum efficiency, in some implementations electrical energy is harvested during both the downward and upward movements of the drive shaft. More specifically, the rotor or gear 122 is rotated in a first direction (e.g., clockwise) during the downward movement and in a second, opposite direction (e.g., counter clockwise) during the upward movement. As a result, the resulting electrical energy generated by the electrical generator 118 changes polarity with each change of direction. Accordingly, by rectifying and filtering the energy from the electrical generator, the energy generated during both the downward and upward movements can be stored in one or more ultra-capacitors (also known as super-capacitors). To this end, FIG. 8 shows a representative electrical schematic for the energy harvesting system according to an embodiment of the present disclosure. As shown, the energy harvesting system includes the electrical generator 118, a voltage rectifier 124, and a voltage regulator 126 that are in communication with an ultra-capacitor 128 that outputs a DC voltage 130 to power the various electrical components of the patient simulator 100 (including controllers/displays coupled thereto in some instances). It is understood that the output DC voltage 130 may be subject to additional amplification, filtering, modulation, and/or other conditioning for application to one or more of the features of the patient simulator. Ultra-capacitors are particularly suitable for use in the context of the present disclosure because they charge faster than batteries (e.g., between 1 and 30 seconds in most instances), have increased power relative to typical rechargeable batteries (e.g., on the order of ten times more power), and have a lift cycle that is a thousand times the longer than typical rechargeable batteries. However, the present disclosure is not limited to the use of ultra-capacitors. Rather, it is understood that the one or more rechargeable batteries may be used instead of or in combination with the ultra-capacitor(s). Further, it is understood that while reference may be made to a single ultra-capacitor this is simply for sake of clarity and those skilled in the art will recognize that multiple ultra-capacitors arranged in parallel, series, and/or combinations thereof may be utilized.

Having converted the mechanical energy into electrical power, sensors and electronic circuits are powered with the electrical energy to simulate several human functionalities and/or monitor user interaction with the patient simulator, including: measuring the pace and intensity of chest compression and ventilations; providing a visual and/or audible feedback to a user regarding the effectiveness/quality of chest compressions and ventilations for evaluation in real time as well as for guidance when self-training; generating ECG waveforms that can be measured using real medical instruments; defibrillation and pacing with real medical instruments; sensing endotracheal intubation positions; providing oxygen saturation measurable with real medical instruments; and/or combinations thereof.

While exemplary functionalities of the patient simulator 100 are described above, no limitation is intended thereby. Rather, it is understood that the concepts of the present disclosure are applicable to a wide range of medical simulation functionalities and features. Accordingly, in some instances, the patient simulator 100 includes one or more features as described in the context of the simulators disclosed in U.S. patent application Ser. No. 13/223,020, U.S. patent application Ser. No. 13/031,116, U.S. patent application Ser. No. 13/031,087, U.S. patent application Ser. No. 13/031,102, U.S. patent application Ser. No. 12/856,903, U.S. patent application Ser. No. 12/708,682, U.S. patent application Ser. No. 12/708,659, U.S. patent application Ser. No. 11/952,606, U.S. patent application Ser. No. 11/952,669, U.S. Pat. No. 8,016,598, U.S. Pat. No. 7,976,313, U.S. Pat. No. 7,976,312, U.S. Pat. No. 7,866,983, U.S. Pat. No. 7,114,954, U.S. Pat. No. 7,192,284, U.S. Pat. No. 7,811,090, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, and U.S. Pat. No. 5,472,345, each of which is hereby incorporated by reference in its entirety.

Further, in some instances, the patient simulator 100 includes one or more features as provided in medical simulators provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe, S222 Clinical Chloe, S222.100 Super Chloe, S303 Code Blue®, S304 Code Blue®, S100 Susie®, S100 Simon®, S200 Susie®, S200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle, and/or other patient simulators.

Figure 9:
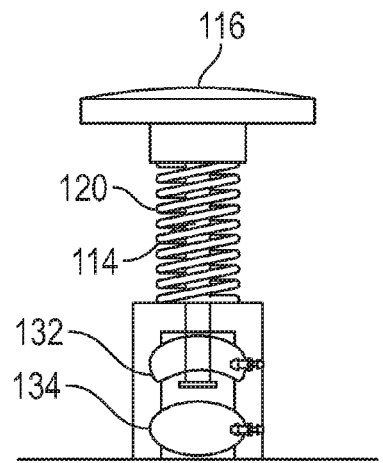
FIG. 9 is a schematic side view of an air harvesting system for use in the patient simulators of the present disclosure according to an embodiment of the present disclosure.
Figure 10:
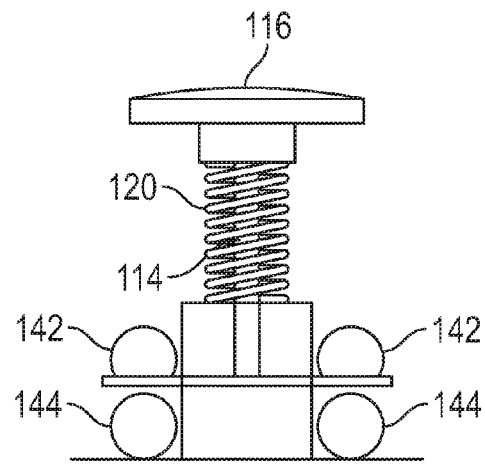
FIG. 10 is a schematic rear view of an air harvesting system for use in the patient simulators of the present disclosure according to another embodiment of the present disclosure.

FIG. 6 shows a pump portion 132 of an air harvesting system of the patient simulator according to an embodiment of the present disclosure. In that regard, in addition to harvesting electrical energy as discussed above, the chest compressions of the patient simulator are also utilized to harvest air that is stored within the reservoirs 110 and 112 in some instances. More specifically, the motion associated with chest compressions can be utilized to actuate one or more pumps (such as pump 132) that are in communication with the reservoirs 110 and 112 such that the pumps fill the bladders with air in response to the chest compressions. In some instances, at least two pumps are provided such that the reservoirs 110 and 112 are filled during both the downward and upward movements associated with the chest compressions. For example, FIG. 9 illustrates a pump system having an upper pump 132 and a lower pump 134. The lower pump 134 is compressed as a result of the downward motion of the drive shaft 114 during a chest compression and the upper pump 132 is compressed as a result of the upward motion of the draft shaft 114 caused by the recoil spring 120. FIG. 10 illustrates another pump system that includes a pair of upper pumps 142 and a pair of lower pumps 144. Similarly, the lower pumps 144 are compressed as a result of the downward motion of the drive shaft 114 during a chest compression and the upper pumps 142 are compressed as a result of the upward motion of the draft shaft 114 caused by the recoil spring 120. In this manner, the air recovery system also takes advantage of the two-way movement associated with the chest compressions to efficiently fill the bladders 110 and 112 with air.

Figure 11:
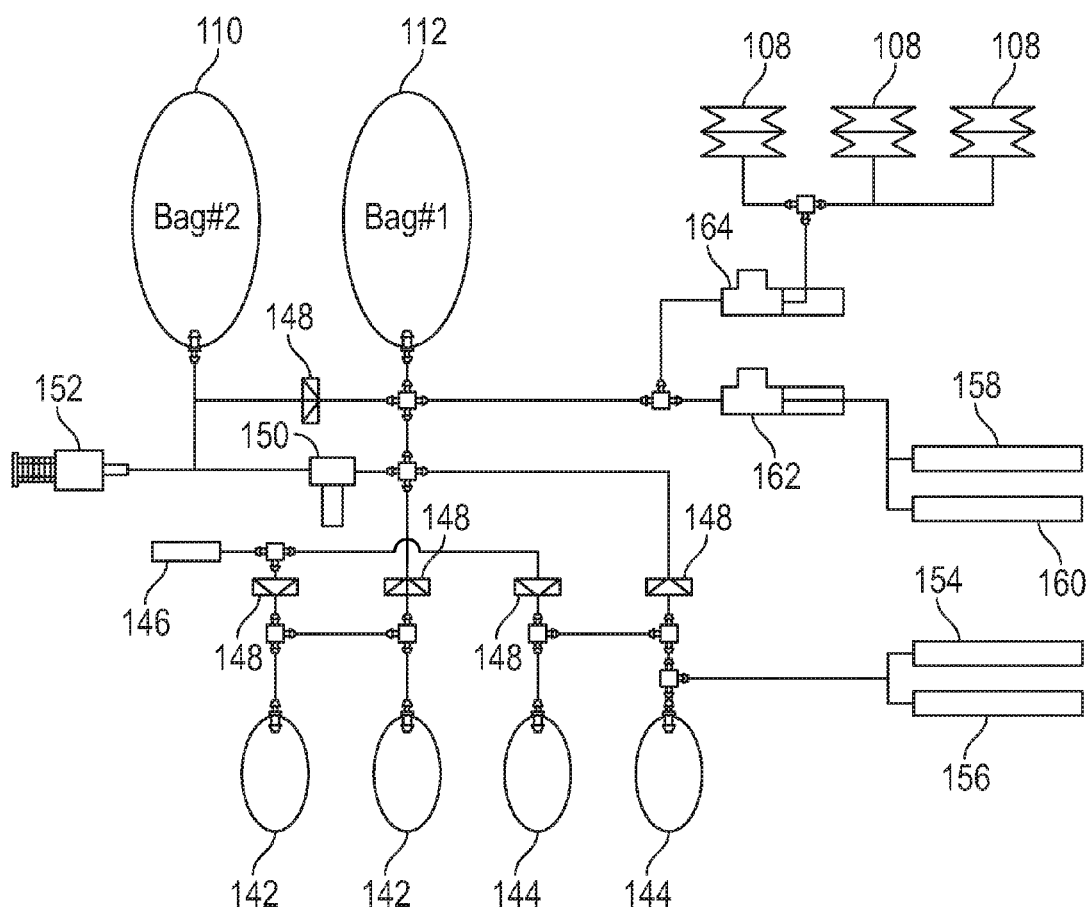
FIG. 11 is a schematic diagram of an air harvesting system for use in the patient simulators of the present disclosure according to an embodiment of the present disclosure.

To that end, FIG. 11 provides a schematic diagram of an air harvesting system for use in the patient simulators of the present disclosure according to an embodiment of the present disclosure. As shown, the upper and lower pumps 142 and 144 are utilized to fill reservoirs 110 and 112 with air. In that regard, a filter 146 and check valves 148 are utilized to control the flow of air first into reservoir 112 and then into reservoir 110. Variable relief valve 150 facilitates the flow of air into reservoir 110 after reservoir 112 has reached sufficient pressure. In some instances, the variable relief valve 150 is set at the factory to a desired level. Relief valve 152 provides an escape path for air to prevent the reservoirs 110 and 112 from becoming over pressurized, which could result in damage to the reservoirs 110, 112. A pair of tubular members 154 and 156 that extend into the neck of the patient simulator are in communication with the air passageway of the lower pumps 144 such that upon each chest compression a simulated carotid pulse is generated within the tubular members 154 and 156 that can be felt by a user. This represents the natural carotid pulse reaction of a real patient in response to proper chest compressions. Further, a pair of tubular members 158 and 160 that also extend into the neck of the patient simulator are in communication with the air supply provided by the reservoirs 110 and 112. In that regard, the tubular members 158 and 160 are configured to provide a simulated carotid pulse in response to the user reviving the patient simulator (as determined by an instructor and/or a setting of the patient simulator based on the user's interaction with the patient simulator). The flow of air through the tubular members 158 and 160 is controlled by a pneumatic valve 162. The timing and flow rate through the valve 162 is controlled to simulate a natural carotid pulse. Therefore, depending on the simulation scenario the timing and/or flow rate may vary. Similarly, a pneumatic valve 164 is utilized to control the flow of air to chambers 108 that are utilized to cause the simulated chest rise of the patient simulator 100. The timing and flow rate through the valve 164 is controlled to simulate a natural chest rise and, therefore, depending on the simulation scenario the timing and/or flow rate may vary.

Figure 12:
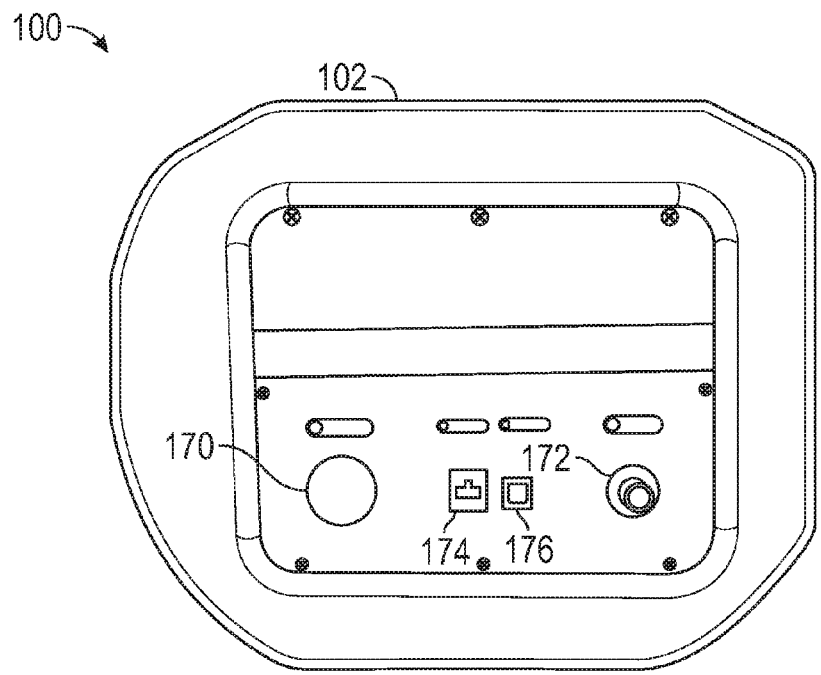
FIG. 12 is an end view of an interface portion the patient simulator of FIGS. 1-5.
Figure 13:
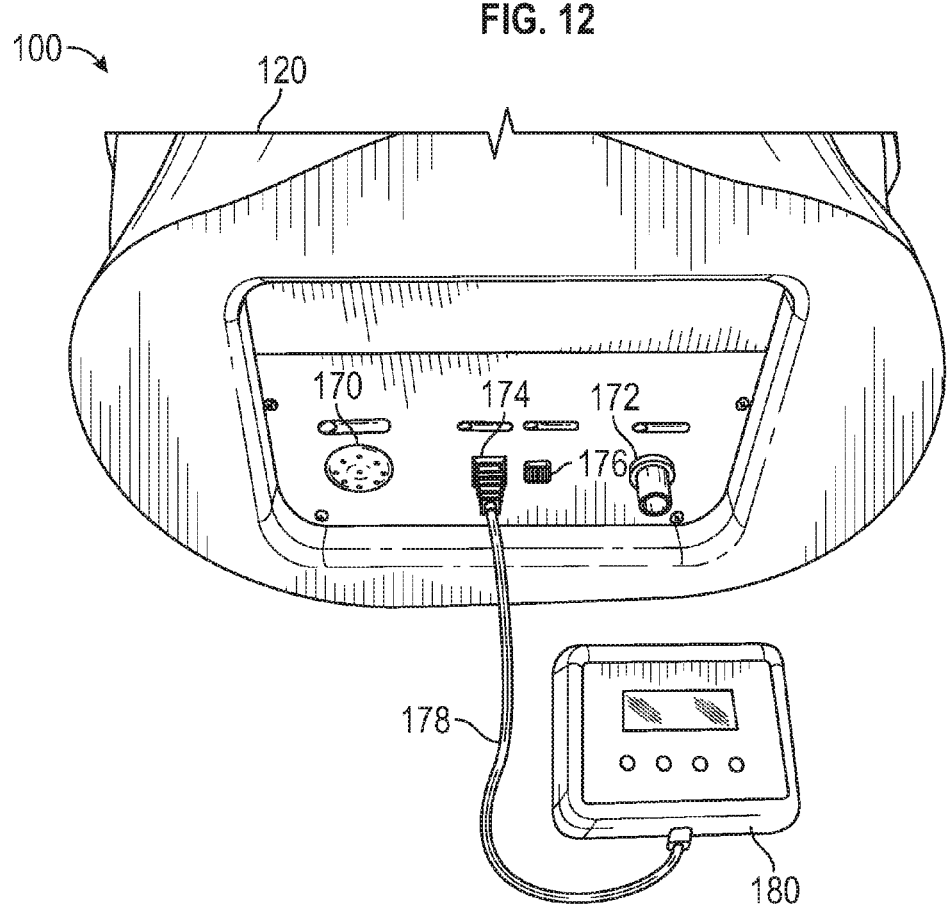
FIG. 13 is a perspective view of the interface portion of the patient simulator of FIG. 12 shown connected to an external controller according to an embodiment of the present disclosure.

FIGS. 12 and 13 depict an end view of the patient simulator 100. As shown, the patient simulator 100 includes a speaker 170 configured to provide audible sounds, feedback, and/or instructions, an air port 172, an controller port 174, and a USB port 176. FIG. 13 shows a cable 178 connecting a controller/display 180 to the controller port 174. In that regard, the controller/display 180 may be utilized to control aspects of the patient simulator (e.g., an instructor or user may define various settings of the patient simulator (such as desired chest compression rate, desired chest compression depth, desired intubation rate, desired chest compression to intubation ratio, etc.), select desired training scenarios, start/stop training, etc.). The display of the controller/display 180 may also provide feedback to a user either in real time or after training that can be used to evaluate the user's performance. In some instances, the user's performance is stored in a flash memory of the patient simulator 100. To that end, in some implementations the user's performance is retrievable from the flash memory through the USB port 176.

The foregoing outlines features of several embodiments so that those skilled in the art may better understand the aspects of the present disclosure. Those skilled in the art should appreciate that they may readily use the present disclosure as a basis for other devices that simulate medical scenarios and situations, including those involving human tissue. Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed is:

1. A patient simulator, comprising:
a simulated patient body portion; and
an electric-harvesting system positioned within the simulated patient body portion, wherein the electric-harvesting system converts mechanical energy applied to the simulated patient body portion into electric energy for use by one or more components of the simulated body portion, wherein the electric-harvesting system includes a drive shaft and an electrical generator.

2. The patient simulator of claim 1, wherein the simulated patient body portion includes a torso.

3. The patient simulator of claim 2, wherein the mechanical energy applied to the simulated patient body portion includes chest compressions.

4. The patient simulator of claim 1, wherein the electric-harvesting system further includes a recoil spring coupled to the drive shaft.

5. The patient simulator of claim 4, wherein the recoil spring urges the drive shaft towards an original position from a displaced position.

6. The patient simulator of claim 5, wherein the electric-harvesting system harvests electrical energy during movement of the drive shaft both from the original position to the displaced position and from the displaced position to the original position.

7. The patient simulator of claim 1, wherein the electric-harvesting system further includes one or more ultra-capacitors for storing the electric energy.

8. The patient simulator of claim 1, further comprising an air-harvesting system positioned within the simulated patient body portion, wherein the air-harvesting system utilizes the mechanical energy applied to the simulated patient body portion to fill one or more reservoirs positioned within the simulated patient body with air.

9. The patient simulator of claim 8, wherein the air-harvesting system includes at least one pump that is actuated by the mechanical energy applied to the simulated patient body portion.

10. A method of medical simulation, the method comprising:
applying mechanical energy to a patient simulator, wherein the applied mechanical energy is converted into electrical energy by an electric-harvesting system having a drive shaft and an electrical generator positioned within the patient simulator for use by one or more components of the patient simulator; and
providing treatment to the patient simulator based on symptoms simulated by the one or more components of the patient simulator.

11. The method of claim 10, wherein the one or more components of the patient simulator include a simulated respiratory system.

12. The method of claim 10, wherein the one or more components of the patient simulator include a simulated circulatory system.

13. The method of claim 10, wherein the mechanical energy is applied to the patient simulator via chest compressions.

14. The method of claim 10, wherein an air-harvesting system positioned within the patient simulator utilizes the mechanical energy applied to the patient simulator to fill one or more reservoirs positioned within the simulated patient body with air.

15. A patient simulator, comprising:
one or more simulated body portions;
an electric-harvesting system positioned within the one or more simulated patient body portions, wherein the electric-harvesting system converts mechanical energy applied to the one or more simulated patient body portions into electric energy for use by one or more components of the patient simulator, wherein the electric-harvesting system includes a drive shaft and an electrical generator; and
an air-harvesting system positioned within the one or more simulated patient body portions, wherein the air-harvesting system utilizes the mechanical energy applied to the one or more simulated patient body portions to fill one or more reservoirs with air.

16. The patient simulator of claim 15, wherein the one or more simulated body portions include a head and a torso.

17. The patient simulator of claim 16, wherein the mechanical energy applied to the one or more simulated patient body portions includes chest compressions.

18. The patient simulator of claim 17, wherein the electric-harvesting system harvests electrical energy during both downward and upward movements of the chest associated with the chest compressions.

19. The patient simulator of claim 18, wherein the air-harvesting system fills the one or more reservoirs with air during both the downward and upward movements of the chest associated with the chest compressions.

* * * * *